United States Patent [19]

Barter

[11] 3,923,766
[45] Dec. 2, 1975

[54] POLYMERIZATION OF ETHYLENICALLY UNSATURATED MONOMER

[75] Inventor: James A. Barter, Akron, Ohio

[73] Assignee: PPG Industries, Inc., Pittsburgh, Pa.

[22] Filed: June 3, 1974

[21] Appl. No.: 476,117

Related U.S. Application Data

[63] Continuation-in-part of Ser. No. 284,025, Aug. 28, 1972, abandoned, and Ser. No. 385,787, Aug. 6, 1973, abandoned, which is a continuation-in-part of Ser. No. 284,024, Aug. 28, 1972, abandoned.

[52] U.S. Cl. ........ 260/92.8 R; 260/63 R; 260/75 T; 260/75 UA; 260/80 M; 260/85.5 N; 260/85.5 F; 260/87.5 R; 260/87.5 C; 260/87.5 A; 260/87.1; 260/87.7; 260/88.1 R; 260/88.2 C; 260/88.7 D; 260/89.1; 260/89.5 A; 260/89.5 AW; 260/91.1 R; 260/92.8 W; 260/93.55 W; 260/94.9 CD; 252/434

[51] Int. Cl.² .... C08F 2/02; C08F 2/16; C08F 4/30; C08F 4/32

[58] Field of Search ...... 260/92.8 R, 92.8 W, 80 M, 260/85.5 N, 85.5 F, 88.7 D, 93.5 S, 93.5 W, 94.9 CD

[56] References Cited
UNITED STATES PATENTS

| | | | |
|---|---|---|---|
| 2,075,575 | 3/1937 | Douglas | 260/2 |
| 2,447,289 | 8/1948 | Staudinger et al. | 260/88 |
| 2,508,801 | 5/1950 | Sans | 260/92.8 |
| 2,663,701 | 12/1953 | Ronay et al. | 260/85.5 |
| 3,373,150 | 3/1968 | Pears et al. | 260/92.8 |
| 3,577,401 | 5/1971 | Smith | 260/92.8 |

FOREIGN PATENTS OR APPLICATIONS

| | | |
|---|---|---|
| 723,991 | 2/1952 | United Kingdom |
| 890,289 | 2/1944 | France |
| 1,223,348 | 6/1960 | France |
| 387,323 | 1/1933 | United Kingdom |

OTHER PUBLICATIONS

Szmant, H. H., Organic Chem., Prentice Hall, N.J. (1957), 443.

*Primary Examiner*—John Kight, III
*Attorney, Agent, or Firm*—Irwin M. Stein

[57] ABSTRACT

Ethylenically unsaturated material susceptible to free-radical polymerization, e.g., vinyl chloride and unsaturated polyesters, is polymerized, e.g., in an aqueous medium with an alkaline buffering reagent and an initiator system comprising an acid anhydride, e.g., isobutyric anhydride, and a peroxygen compound selected from an organic peroxy acid (peracid), e.g., peracetic acid, and hydrogen peroxide. Optionally, a further organic free-radical type initiator, e.g., lauroyl peroxide, a dialkyl peroxydicarbonate or azobisisobutyronitrile, is used in combination with the acid anhydride and peroxygen compound.

62 Claims, 1 Drawing Figure

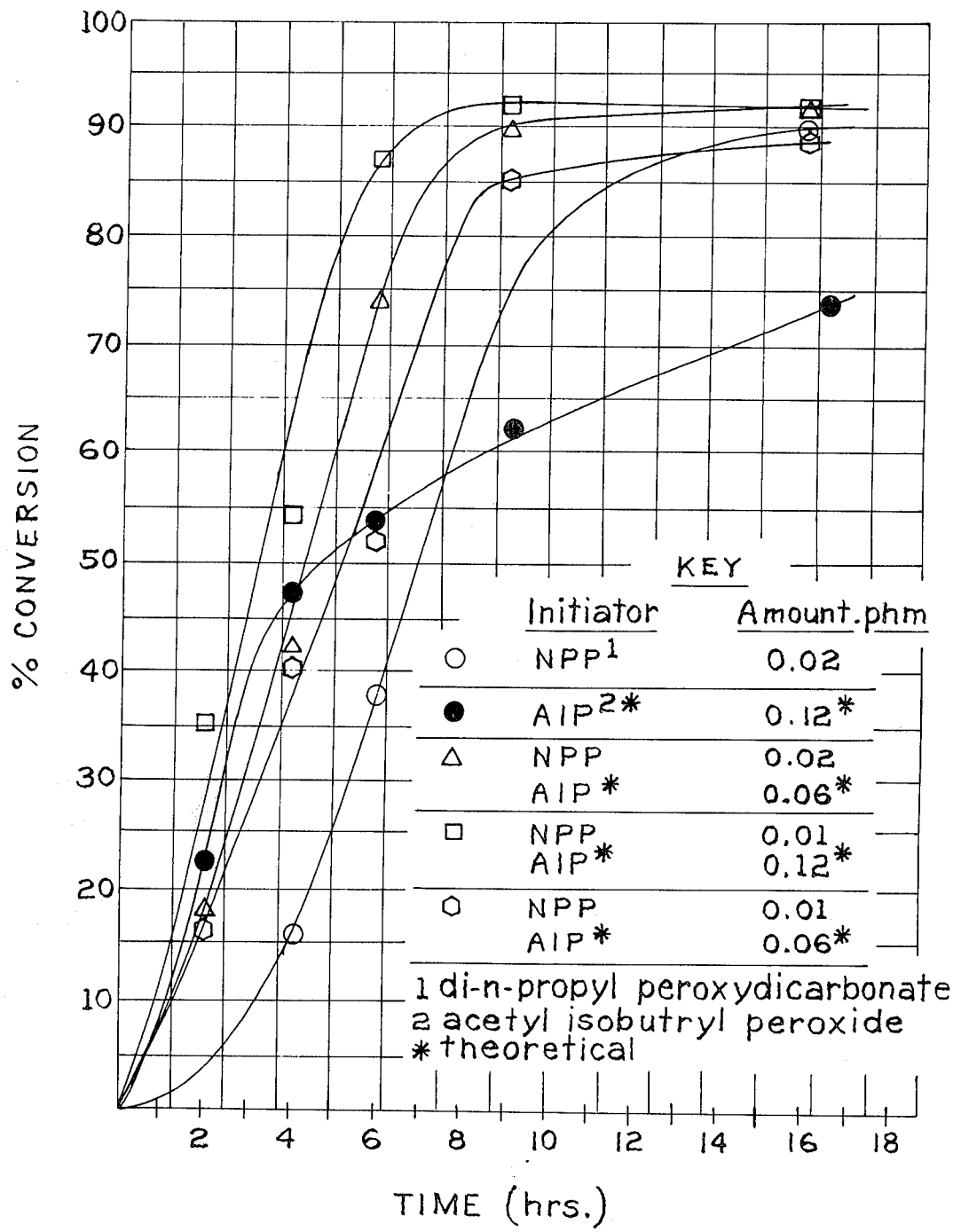

POLYMERIZATION OF ETHYLENICALLY UNSATURATED MONOMER

CROSS-REFERENCE TO RELATED APPLICATIONS

This application is a continuation-in-part application of my copending applications Ser. No. 284,025, filed Aug. 28, 1972 now abandoned and Ser. No. 385,787, filed Aug. 6, 1973, now abandoned, which is a continuation-in-part application of my copending application Ser. No. 284,024, filed Aug. 28, 1972, now abandoned.

DESCRIPTION OF THE INVENTION

The polymerization of ethylenically unsaturated materials susceptible to free-radical polymerization, e.g., unsaturated vinyl type monomers, such as vinyl chloride, with organic peroxides is well recorded in the literature and has found extensive commercial application. Among the organic peroxides suggested for use as initiators for such monomeric materials are diacyl peroxides, such as dilauroyl peroxide, dibenzoyl peroxide and diisobutyryl peroxide; dialkyl peroxydicarbonates, such as diisopropyl peroxydicarbonate, di-n-propyl peroxydicarbonate, di-sec-butyl peroxydicarbonate, dicyclohexyl peroxydicarbonate, di-4-tertiarybutylcyclohexyl peroxydicarbonate and di-2-ethylhexyl peroxydicarbonate; and t-butylperoxy esters, such as tertiary-butylperpivalate and tertiarybutylperneodecanoate.

Commercially available organic peroxides, while widely used as polymerization initiators, have limited utility because their rate of decomposition at a particular temperature is fixed and because the temperature at which the polymerization of the monomer is conducted affects the properties of the polymer product produced. Thus, for optimum results, the rate of decomposition of the initiator at the polymerization temperature should be such that the polymerization can be conducted at a useful rate. Consequently, the polymerization industry prefers, in many cases, to use initiators that have significant reactivity at relatively low temperatures, e.g., below 50°C., so that high polymerization rates at such temperatures can be achieved. It is, of course, axiomatic that organic peroxides are unstable compounds and that their instability increases with their reactivity. Highly reactive organic peroxides have the disadvantages of decomposing, often rapidly, at room temperature. Thus, the hazards associated with the use of such peroxides are great.

At temperatures above room temperature, organic peroxides are often explosive. Many organic peroxides have the disadvantage of being very shock-sensitive. It is known, for example, that diacetyl peroxide, dipropionyl peroxide and diisobutyryl peroxide decompose explosively upon heating. The aforementioned compounds are also very shock-sensitive, which accounts for their availability in phlegmatized form. Dipivaloyl peroxide is probably not in use commercially despite its high reactivity because of its great instability.

The reactivity of diacyl peroxides depends, in part, on the nature of the hydrocarbon groups attached to the carbonyl carbon atoms. For example, lauroyl peroxide is relatively slow acting at low temperatures. Reportedly, in order to obtain short polymerization reaction times using lauroyl peroxide, large amounts of such initiator are required or the polymerization temperature must be raised. Both of the aforementioned alternatives are often undesirable since the use of higher initiator concentrations affects the thermal stability of the polymer produced, i.e., the ability of the polymer to withstand elevated temperatures without discoloration; while the use of higher polymerization temperatures causes a reduction in the molecular weight of the polymer produced with the consequent effect on the physical properties of the polymer.

The more reactive diacyl peroxides, such as diisobutyryl peroxide, while faster acting at relatively low temperatures, are, as a consequence, more hazardous to synthesize, transport and use. Often, refrigeration facilities are required for their shipment and storage. Further, the more reactive diacyl peroxides also tend to exhaust early at the conventional polymerization temperatures now used, i.e., decompose completely before the polymerization reaction has proceeded to a high percent conversion of monomer to polymer. The use of greater quantities of more reactive initiator will overcome premature exhaustion; however, that solution is not desirable for the reason that the polymerization reaction becomes too rapid and the amount of heat generated in the reactor cannot be dissipated adequately. The result can be a runaway polymerization reaction which occurs at higher temperatures than desired with the consequent effect on the physical properties of the polymer caused by the reduction in molecular weight.

Dialkyl peroxydicarbonates, such as diisopropyl peroxydicarbonate, have been found most suitable for use as initiators for the polymerization of ethylenically unsaturated monomers, such as vinyl chloride, at polymerization temperatures conventionally used, i.e., from 45° to 80°C. Although the peroxydicarbonates provide generally satisfactory over-all polymerization rates, a still further reduction in polymerization cycle time is desirable.

Most diacyl peroxides in present commercial use undergo decomposition at good rates at temperatures of from 50° C. to 100° C. Economically useful and safe initiators for free-radical polymerizations at temperatures below 50° C. are still scarce, and there is an urgent need for them because the polymer products obtained at such temperatures have different properties than polymers obtained at temperatures above 50° C. and because their use in combination with conventional commercial initiators would result in increased production at existing facilities.

It has now been discovered that the hazards and problems associated with the use of the more reactive free-radical initiators, i.e., initiators capable of producing adequate concentrations of free-radical species to initiate and propagate polymerizations at relatively low temperatures (below 50° C.), can be eliminated by the use of a novel method for providing an initiating system in a polymerization medium useful for the polymerization of ethylenically unsaturated materials.

In accordance with the present method, an organic acid anhydride and a peroxygen compound selected from an organic peroxy acid (peracid) and hydrogen peroxide are introduced into the polymerization medium. Preferably, the anhydride and peroxygen compound are introduced separately into the polymerization medium. The combined presence of the aforementioned acid anhydride and the selected peroxygen compound effects the polymerization of the ethylenically unsaturated material charged to the polymerization vessel. It has been found further that the aforementioned acid anhydride — peroxygen compound system can be used advantageously in combination with a further organic free-radical type initiator, such as lauroyl peroxide, a dialkyl peroxydicarbonate or azobisisobutyronitrile, to provide a smooth and continuous polymerization with shorter polymerization cycle times than when such further organic free-radical initiator is used alone. This use of such combination of initiators results in increased capacity of the polymerization kettles, e.g., of from 10 to 20 percent or more depending on the nature of the polymerization process, without the corresponding capital investment in polymerization equipment.

BRIEF DESCRIPTION OF THE DRAWING

The attached drawing is a plot of the percent conversion to polymer of vinyl chloride monomer at 50° C. versus polymerization time, in hours, using as initiator systems (1) di-n-propyl peroxydicarbonate, isobutyric and peracetic acid, (2) di-n-propyl peroxydicarbonate, and (3) isobutyric anhydride and peracetic acid.

DETAILED DESCRIPTION

The process described herein is applicable to the polymerization of ethylenically unsaturated materials, i.e., materials containing an ethylenic

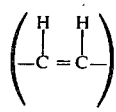

or vinyl ($CH_2 = C<$) linkage that are susceptible to free-radical polymerization. Examples of such compounds include: aryl-substituted olefins, such as styrene, alphachlorostyrene and the like; acrylic and alpha-substituted acrylic acids, e.g., methacrylic acid, $C_1$–$C_4$ alkyl esters, nitriles and amides of such acids, such as acrylonitrile, alpha-methacrylonitrile, methyl acrylate, ethyl acrylate, methyl methacrylate, methacrylamide, acrylamide and the like; vinyl esters, ethers, ketones and halogen-containing vinyl and vinylidene compounds, such as vinyl chloride, vinylidene chloride, vinyl bromide, vinylidene bromide, vinyl acetate, vinyl propionate, vinyl butyrate, vinyl fluoride, vinylidene fluoride, 1,1-chlorofluoroethylene, tetrafluoroethylene, 1,1-difluoro-2,2-dichloroethylene, perfluoropropylene, 3,3,3-trifluoropropylene, 3,3,3-trichloropropylene and 2-chloropropylene and the like; and unsaturated polyesters, particularly water dispersible unsaturated polyesters having a high acid number.

Unsaturated polyesters are prepared typically by the reaction of dibasic acids or anhydrides and polyhydric alcohols, one of which is unsaturated. Generally, the acid or anhydride reactant is unsaturated. Common examples thereof include maleic acid, maleic anhydride, fumaric acid and itaconic acid. Often, saturated acids or anhydrides are used in addition to the unsaturated acid. Examples thereof include chlorendic acid and anhydride, succinic acid and anhydride, sebacic acid, o-phthalic acid and anhydride, isophthalic acid, terephthalic acid and adipic acid.

Polyhydric alcohols typically are dihydric but may contain three or more hydroxyls. Examples of such alcohols include ethylene glycol, propylene glycol, diethylene glycol, triethylene glycol, neopentyl glycol, tetraethylene glycol, butylene glycol, dipropylene glycol, glycerol, trimethylolethane, trimethylolpropane, pentaerythritol, sorbitol and others.

The preparation of unsaturated polyesters is well known. See, for example, U.S. Pat. No. 3,390,135. By further reacting the unsaturated polyester with a vinyl type monomer, such as vinyl acetate, styrene and methyl methacrylate, cross-linked, three-dimensional resins are formed. Copolymerization of the unsaturated polyester with the vinyl monomer to form unsaturated polyester resins is free-radical initiated since the reaction is essentially a vinyl-type polymerization. The present process is applicable, therefore, to the preparation of unsaturated polyester resins.

Additional applications include curing agents for elastomers, e.g., natural and butadiene rubbers, polyurethanes and adhesives and as cross-linking agents for polyolefins, e.g., polyethylene and ethylene-containing copolymers.

The present process is particularly applicable to the polymerization of vinyl chloride, as well as the copolymerization of mixtures of two or more of the aforementioned monomeric materials, e.g., the polymerization of vinyl chloride with other copolymerizable monomers, such as vinyl bromide, vinylidene chloride, vinyl acetate, methyl acrylate, methyl methacrylate and the like. When copolymerizing vinyl chloride with other monomer(s) copolymerizable therewith, vinyl chloride is used generally in amounts greater than 50 mole percent, e.g., from 75 to 95 mole percent of vinyl chloride and from 5 to 25 mole percent of one or more of the other unsaturated copolymerizable monomer(s). The type of polymer products contemplated herein include graft, random, alternating and block copolymers. The exact nature of the polymer product is more a function of the polymerization procedure than the particular initiator used.

The type of polymer produced by the polymerization or copolymerization of the aforementioned polymerizable materials, e.g., monomers such as vinyl chloride, depends to a large extent on the temperature at which the polymerization is conducted. For example, polyvinyl chloride having properties useful for major commercial applications of that polymer are prepared at polymerization temperatures in the range of 40°–65° C.

Dialkyl peroxydicarbonate initiators, such as diisopropyl peroxydicarbonate, have been found to be reactive and have high efficiencies at from about 45° C. to about 80° C., e.g., 45°–55° C. Although the peroxydicarbonates provide generally satisfactory overall polymerization rates, a still further reduction in polymerization cycle time is desirable. This can be achieved by reducing the warm-up period of the polymerization cycle. In a typical vinyl chloride batch polymerization, the contents of the polymerization vessel are normally at room temperature or below at the start of the cycle. The contents are heated or are permitted to heat up to temperatures approaching the desired polymerization temperature. At that point, heat is removed from the vessel by indirect heat exchange means to maintain the polymerization temperature at the desired level. Most polymerization vessels use ambient water as the coolant to remove the excess heat of polymerization, which limits the cooling rate, i.e., the rate at which heat can be removed from the vessel. This, in turn, restricts the type of initiators that can be used to initaite polymerization in such vessels to those initiators that generate free radicals fairly evenly over the desired temperature range.

The use of low temperature initiators, i.e., initiators active below 50° C., e.g., in the 20°–30° C. range, is fraught with difficulties. By virtue of the very requirement that the initiator be thermally unstable at room temperature, such initiators are hazardous to prepare, transport, store and use in commercial polymerization facilities. Such initiators must be shipped, if at all, in dilute solution and must be refrigerated at both the point of manufacture, during shipment and during storage prior to use. Further, such low temperature initiators, e.g., diisobutyryl peroxide, can also cause difficulties in the polymerization reaction because they can decompose too rapdily and cause an excess amount of heat of polymerization to be generated. Such an event can exceed the cooling capacity of the vessel, increase the polymerization temperature to above the desired level, and thereby adversely affect the properties of the polymer produced. Further, the so-called low temperature initiators may exhaust prematurely when higher polymerization temperatures are reached, which results in monomer conversion substantially less than the 80–92 percent conversion generally attained in batch polymerizations.

It has now been discovered unexpectedly that the combined use of organic acid anhydride(s) and organic peroxy acid(s) (peracid) or hydrogen peroxide in the polymerization medium results in the smooth and controlled polymerization of ethylenically unsaturated monomers. By regulating the amount of anhydride and peroxygen compound, e.g., peracid, or hydrogen peroxide, used, the polymerization can be initiated at a relatively low temperature, i.e., 20° to 30°C., and continued to substantial, i.e., 80 to 92 percent, monomer conversion. The present process is especially useful for conducting polymerizations in the 25°–55° C. temperature range, e.g., 30° C.–40° C. Thus, the present process provides a useful and safe source of free radicals for the polymer industry.

Anhydrides useful in the practice of the present process are anhydrides of aliphatic and aromatic carboxylic acids, preferably saturated monocarboxylic acids, which can be represented by the general formula,

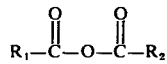

wherein $R_1$ and $R_2$ are each alkyl, aryl or cycloalkyl radicals. Generally, the alkyl radical contains from 1 to 20 carbon atoms, more commonly from 1 to 12 carbon atoms. The aryl and cycloalkyl radicals typically contain from 6 to 10 carbon atoms. $R_1$ and $R_2$ can be the same or can be different. Most often, they are the same. The alkyl radicals can be branched or straight, chain, and the alkyl, aryl and cycloalkyl radicals can contain substituents that do not adversely affect the polymerization reaction or polymer product, e.g., alkoxy, halogen, such as chlorine, bromine and fluorine, hydroxyl, amido, cyano, nitroso, nitro, etc., groups.

Preferably, as in the polymerization of vinyl-type unsaturated materials, e.g., vinyl chloride, $R_1$ and $R_2$ are straight chain alkyl groups or the isopropyl group.

Examples of acid anhydrides include: acetic anhydride, propionic anhydride, butyric anhydride, isobutyric anhydride, pivalic anhydride, valeric anhydride, isovaleric anhydride, 2-methyl butyric anhydride, 2-ethyl butyric anhydride, caproic anhydride, caprylic anhydride, isocaproic anhydride, n-heptanoic anhydride, nonoic anhydride, decanoic anhydride, neodecanoic anhydride, undecanoic anhydride, neoheptanoic anhydride, lauric anhydride, tridecanoic anhydride, 2-ethyl hexanoic anhydride, acetic propionic anhydride, acetic isobutyric anhydride, myristic anhydride, palmitic anhydride, stearic anhydride, phenylacetic anhydride, cyclohexanecarboxylic anhydride, 3-methylcyclopentanecarboxylic anhydride, beta-methoxy propionic anhydride, alpha-ethoxy butyric anhydride, benzoic anhydride, o-, m-, and p-toluic anhydride, 2, 4, 6-trimethylbenzoic anhydride, o-, m-, and p-chlorobenzoic anhydride, o-, m-, and p-bromobenzoic anhydride, o-, m-, and p-nitrobenzoic anhydride, o- and p-hydroxybenozic anhydride, o-, m- and p-aminobenzoic anhydride, and o-, m-, and p-methoxybenzoic anhydride.

In combination with the aforementioned acid anhydrides, there is used, in accordance with one embodiment of the present process, organic peroxy acids (peracids). Preferably, the peracids are those of saturated aliphatic or aromatic carboxylic acids. Such peracids can be represented by the general formula,

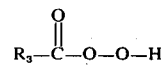

wherein $R_3$ is an aliphatic, e.g., alkyl, radical of from 1 to 20 carbon atoms or an aryl radical of from 6 to 10 carbon atoms. Preferably, the alkyl radical contains from 1 to 12 carbon atoms. The aliphatic group can, of course, be branched or straight chain. The alkyl and aryl radicals can contain substituent groups that do not adversely affect the polymerization reaction or polymer product, e.g., alkoxy, halogen, such as chlorine, bromine or fluorine, hydroxyl, amido, cyano, nitroso, nitro, etc. groups.

Examples of peracids include: peracetic acid, permonochloroacetic acid, trifluoroperacetic acid, perdichloroacetic acid, pertrichloroacetic acid, perpropionic acid, permonochloropropionic acid, perdichloropropionic acid, perbromoacetic acid, perbromopropionic acid, per-alpha-chlorolauric acid, per-alpha, alpha-dichlorolauric acid, per-12-hydroxystearic acid, per-alpha-bromocapric acid, per-alpha-bromostearic acid, perglycolic acid, peroxylactic acid, perpyruvic acid, 3-chloro-perbenzoic acid, m-bromo-perbenzoic acid, pentafluoroperbenzoic acid, p-tertiarybutyl perbenzoic acid, perisopropionic acid, per-n-butyric acid, perisobutyric acid, pervaleric acid, perpivalic acid, perisovaleric acid, percaproic acid, percaprylic acid, pernonoic acid, perdecanoic acid, perneodecanoic acid, perheptanoic acid, perundecanoic acid, perlauric acid, pertridecanoic acid, permyristic acid, perpentadecanoic acid, perpalmitic acid, perheptadecanoic acid, perstearic acid, pernonadecanoic acid, pereicosanoic acid, per(alpha-ethyldecanoic) acid, per(alpha-ethyldodecanoic) acid, per(alpha-phenyldodecanoic) acid, phenylperacetic acid, peroxyfuroic acid, cyclohexanepercarboxylic acid, perbenozic acid, 2-, 3-, and 4-nitroperbenzoic acid, 2-chloro-perbenozic acid, 4-chloro-perbenzoic acid, 2,4- and 3,4-dichloroperbenzoic acid, p-fluoro-perbenzoic acid, 2-methyl-perbenzoic acid, p-isopropylperbenzoic acid, 4-methoxy-perbenzoic acid, 4-cyanoperbenzoic acid, o- and m-aminoperbenozic acid, o- and p-hydroxyperbenzoic acid, o-bromoperbenozic acid, 2-methyl-perbutyric acid, 2-ethyl perbutyric acid and perphthalic acid.

In accordance with a further embodiment of the present process, hydrogen peroxide is used in combination with the aforementioned acid anhydrides. Any source of hydrogen peroxide can be used, i.e., a peroxygen compound which, when dissolved in the polymerization medium yields hydrogen peroxide can be used. Thus, sodium peroxide can also be used in place of hydrogen peroxide. Hydrogen peroxide is, of course, commercially available in several strengths and is prepared commercially by the alternate catalytic reduction-oxidation of an anthraquinone, e.g., 2-ethylanthraquinone. Strengths at which hydrogen peroxide is commercially available include: 3 percent, 6 percent, 27.5 percent, 30 percent, 35 percent, 50 percent, 70 percent and 90 percent. Preferably the more concentrated grades, e.g., 27.5 percent – 50 percent are used since such grades do not introduce as much water into the system as the less concentrated grades and are safer to handle than the more concentrated grades.

It is also contemplated that organic hydroperoxides, which can be represented by the general formula.

wherein $R_4$ is an aliphatic or aromatic radical of from 1 to 20 carbon atoms can be used in place of or in addition to hydrogen peroxide. The aliphatic radical can, of course, be branched or straight chain and can be substituted with groups that do not adversely affect the polymerization reaction or polymer product. Preferably, $R_4$ will contain from 3 to 12 carbon atoms.

Examples of the aforementioned organic hydroperoxides include those wherein $R_4$ is methyl, ethyl, n-propyl, isopropyl, secondary butyl, tertiarybutyl, n-pentyl, 2-methylbutyl, 3-methylbutyl, n-hexyl, 2-methylpentyl, 3-methylpentyl, n-heptyl, n-octyl, 4-methylbenzyl, n-nonyl, dimethylbenzyl, n-decyl, n-dodecyl, diphenylmethyl, n-tetradecyl and n-octadecyl.

Acid anhydrides are typically prepared commercially by heating the corresponding carboxylic acid with acetic anhydride and distilling off acetic acid. This method is useful for preparing anhydrides wherein $R_1$ and $R_2$ are alike. A further process for making acid anhydrides is to condense an acid chloride with the sodium salt of the same acid. This process can be used to prepare anhydrides wherein $R_1$ and $R_2$ are alike or different. Thus, by condensing an acid chloride with the sodium salt of a different carboxylic acid, unsymmetrical acid anhydrides can be prepared.

Numerous methods are known for the preparation of peroxy acids. The lower peroxycarboxylic acids (to $C_4$) are generally prepared by the direct acid-catalyzed reaction of the parent carboxylic acid and 30 to 98 percent hydrogen peroxide. Sulfuric acid or sulfonic acid type ion exchange resins are the most effective and most commonly used catalysts. With water insoluble aliphatic carboxylic acids up to $C_{16}$ or $C_{18}$, concentrated sulfuric acid is a mutual solvent and reaction medium. Yields of $C_6$–$C_{16}$ peroxy acids are usually high and sometimes quantitative when the appropriate excess of 50 to 65 percent hydrogen peroxide is employed. The $C_{18}$ and longer chain aliphatic acids are too insoluble in sulfuric acid, but methanesulfonic acid can be used instead. Chain-substituted aliphatic or aromatic peroxy acids can also be prepared by the methanesulfonic acid procedure. Peroxycarboxylic acids have also been obtained by the reaction of carboxylic acid chlorides or anhydrides with either hydrogen peroxide or sodium peroxide. A further method for the preparation of peroxycarboxylic acids involves the controlled free-radical initiated auto-oxidation of aldehydes in the liquid phase. Details of the aforementioned methods can be found in *Organic Peroxides*, Volume I, pages 313–433, Daniel Swern, Editor, Wiley-Interscience, New York, N.Y. (1970).

Organic e.g., alkyl, hydroperoxides can be prepared by the acid catalyzed reaction of hydrogen peroxide or sodium peroxide with many olefins and alkyl compounds, R'X, wherein X is an electronegative leaving group or wherein R' can stabilize a positive charge at the carbon atom attached to X. Examples of X include: $Cl^-$, $Br^-$, $HO^-$ and $HSO_4^-$. Hydroperoxides can also be obtained by the auto-oxidation of alkanes, aralkanes, alkenes, ketones, enols, aromatic amines, ethers, acetals, etc. A typical example is the auto-oxidation of cumene to cumene hydroperoxide.

The amount of acid anhydride used in the practice of the present process can vary widely and will depend on the monomer polymerized and the temperature at which the polymerization is conducted. Typically, however, from about 0.001 to about 3 weight percent of acid anhydride, based on the total amount of monomer polymerized, is used. With respect to the polymerization of vinyl chloride, amounts of from about 0.01 to about 1 weight percent acid anhydride are suitable.

The amount of peracid used in the practice of the one embodiment of the present process will vary, depending on the amount of anhydride used. An equimolar amount of peracid, based on the anhydride, is preferred; however, less than or more than a molar equivalent of peracid can be used, e.g., a mole ratio of anhydride to peracid of from about 0.1:1 to about 5:1 is contemplated herein. Preferably, a mole ratio of 1:1 is used.

The amount of hydrogen peroxide used in the practice of the present process will vary with the amount of anhydride used. Generally, from about 0.1 to about 10.0 and preferably from about 0.2 to about 2.0 moles of hydrogen peroxide per mole of the anhydride will be used; however, more than such amounts can be used.

While the particular mechanism by which the acid anhydride and peracid cause polymerization of the monomeric materials described above is not known with certainty, it is believed that at least a portion of the anhydride combines with the peracid to form the corresponding diacyl peroxide.

Similarly, while the particular mechanism by which the acid anhydride and hydrogen peroxide cause polymerization of the monomeric materials described above is not known with certainty, it is believed that at least a portion of the anhydride combines with hydrogen peroxide to form the corresponding peroxy acid (peracid), and that such peracid combines with further acid anhydride to form the corresponding diacyl peroxide. The diacyl peroxide, in turn, decomposes to form free radicals which initiate the polymerization of the monomer. From the experimental evidence at hand, it appears that the formation of the diacyl peroxide occurs concurrently with the polymerization reaction. By choosing properly the acid anhydride and peracid, it is possible to produce a variety of one or more diacyl peroxides, both symmetrical and unsymmetrical, in the polymerization medium. Similarly, in the embodiment wherein hydrogen peroxide is used, by choosing properly the acid anhydride, it is possible to produce a variety of symmetrical diacyl peroxides. Since the reactivity of diacyl peroxides depends, in part, on the nature of the alkyl substituent surrounding the peroxy grouping, it is, therefore, possible to conduct polymerizations with a wide variety of diacyl peroxides without the attendant hazards associated with the use of the peroxide per se.

Moreover, by utilizing more than one anhydride and/or more than one peracid, it is possible to produce several different diacyl peroxides in the same polymerization medium and thereby conduct the polymerization in the presence of diacyl peroxides having different reactivities. For example, a mixture of acetic and isobutyric anhydrides can be used in conjunction with peracetic acid and/or perisobutyric acid to form, theoretically, diacetyl peroxide, acetyl isobutyryl peroxide and diisobutyryl peroxide. Further, by adding more than one acid anhydride with hydrogen peroxide to the polymerization medium, it is possible to generate more than one diacyl peroxide in the same polymerization medium and conduct the polymerization in the presence of diacyl peroxides having different reactivities. Thus, by using two different symmetrical acid anhydrides with hydrogen peroxide, it would be expected to generate three different diacyl peroxides — two of which would be symmetrical and one of which would be unsymmetrical. For example, the use of acetic anhydride and isobutyric anhydride would yield diacetyl peroxide, diisobutyryl peroxide and acetyl isobutyryl peroxide.

The above-described process, therefore, permits the use of very reactive, low temperature initiators without the attendant hazards associated with the use of such peroxides in neat (preformed) form for the reason that the anhydrides, peracids and hydrogen peroxide described above are relatively safe materials to prepare, ship, store and handle.

In addition to the organic acid anhydride and peroxygen compound, i.e., the peracid or hydrogen peroxide, it has been found that the presence of an alkaline buffering reagent in the polymerization medium enhances the interaction of the acid anhydride with the peroxygen compound. The alkaline buffering reagent should be soluble in the polymerization medium and/or the phase wherein the anhydride and peroxygen compound are present so as to be able to form the salt of the carboxylic acid released as the theoretical by-product. Suitable alkaline reagents that can be used include the alkali metal and alkaline earth metal alkaline reagents such as the carbonates and bicarbonates of such metals, e.g., sodium, potassium and calcium carbonates and bicarbonates, as well as sodium hydroxide, sodium acetate, borax, potassium tartrate, sodium citrate, trisodium phosphate, sodium pyrophosphate, ammonium hydroxide and organic bases, e.g., the Triton surfactants.

Organic bases that can be used as the alkaline buffering reagent are those soluble organic compounds that can abstract a hydrogen atom (proton) from hydrogen peroxide, the peracid or the organic hydroperoxide. Examples of such compounds include: pyridine, pyrrolidone, 1,4-dioxane, tetrahydrofuran and quaternary ammonium hydroxide, such as, tetramethylammonium hydroxide, trimethyl-s-butyl ammonium hydroxide, trimethyl neomenthylammonium hydride, tetraethylammonium hydroxide, trimethyl cetylammonium hydroxide, dioctadecyl dimethylammonium hydroxide, octadecyl dimethyl benzyl ammonium hydroxide, and benzyl trimethylammonium hydroxide (Triton B). The quaternary ammonium hydroxides are preferred. These compounds dissociate in solution, e.g., aqueous solution and have the same basic strength in water as sodium or potassium hydroxide.

Quaternary ammonium hydroxides can be represented by the general formula,

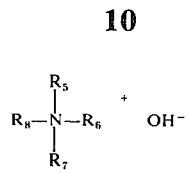

wherein $R_5$, $R_6$, $R_7$ and $R_8$ are each selected from the group consisting of $C_1$–$C_{20}$ alkyl, and $C_7$–$C_{20}$ aralkyl. Preferably, at least two of the organic substituents are alkyl radicals and more preferably lower alkyl ($C_1$–$C_4$) substituents. The aforementioned compounds, more commonly written $(R)_4N^+OH^-$ can be prepared by shaking the corresponding quaternary ammonium halide or acid sulfate with silver hydroxide or barium hydroxide respectively.

The amount of alkaline buffering reagent used is not critical and typically varies from 100 to 1,000 weight percent, based on the amount of acid anhydride used. A suitable concentration of buffering reagent is from about 0.01 percent to about 10 percent by weight, and preferably from about 0.5 percent to about 1.5 percent, of the monomer feed. The buffering reagent is used to maintain the pH of the reaction mixture between 6 and 12, preferably between 8 and 9. Consequently, suitable buffering agents may be already present in the polymerization medium, depending on the polymerization recipe.

The diacyl peroxides which are believed to be generated in situ in the polymerization medium by the embodiment that uses the peracid, can be represented by the general formula,

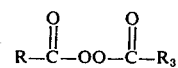

wherein R is $R_1$ or $R_2$ from the acid anhydride and $R_3$ is from the peroxy carboxylic acid. $R_1$, $R_2$ and $R_3$ are defined above. Typical examples thereof include: diacetyl, dipropionyl, diisobutyryl, dibutyryl, acetyl isobutyryl, acetyl butyryl, acetyl valeryl, acetyl propionyl, acetyl pivalyl, acetyl benzoyl and acetyl-2-methyl butyryl peroxide.

The diacyl peroxides which are believed to be generated in situ in the polymerization medium by the embodiment that uses hydrogen peroxide can be represented by the general formula,

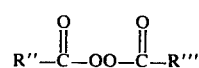

wherein R'' and R''' are each selected from $R_1$ and $R_2$ (from the acid anhydride) and are defined above. Typical examples thereof include: diacetyl, dipropionyl, diisobutyryl, di-n-butyryl, dipivaloyl, diisovaleryl, di-2-ethylhexanoyl and dibenzoyl peroxides.

The present process of providing peroxide initiators in a polymerization system, especially initiating amounts of peroxide, is applicable particularly to both emulsion and suspension polymerizations, i.e., polymerizations conducted in an aqueous medium, as well as bulk polymerizations wherein no solvent or aqueous medium (water) is used. Bulk polymerization is the polymerization of pure monomer(s) during which the only additives present are such aids to polymerization as initiators, chain regulators, activators, etc. The present process is also considered to be utilizable for solution polymerizations wherein the polymerization is carried out in the presence of a solvent. In the case of bulk polymerizations, the soluble organic base is used as the alkaline buffering reagent. For purposes of brevity, both types of aqueous polymerizations will be referred to collectively as a suspension polymerization. By initiating amount is meant those amounts of compounds or initiators used individually or collectively that is sufficient to cause polymerization of the polymerizable monomer, i.e., sufficient to form polymer molecules from the particular monomer(s) used.

The practice of the present process is especially useful in the polymerization of monomeric materials heretofore described in an aqueous medium. In a typical suspension polymerization, the polymerization vessel is filled with water to which is added suspending agents, chain terminators, acid anhydride(s), peroxycarboxylic acid(s) or hydrogen peroxide and alkaline buffering agent. The polymerizable monomer is then charged to the vessel and the vessel closed.

The amount of water used, which is typically demineralized water, is large, based on the amount of monomeric material charged to the vessel. Dilution ratios of 2:1 to 40:1, usually 3:1 to about 20:1, are common. At such dilution ratios, it is surprising to find that the acid anhydride and peracid or hydrogen peroxide, in the typical amounts used to produce initiating amounts of initiator, appear to react with one another to generate in situ what is believed to be a diacyl peroxide. This is especially surprising since the acid anhydride and peracid also hydrolyze in water. It, therefore, might have been assumed that with the above dilutions, the competing hydrolysis reactions of the acid anhydride and peracid would proceed at such a rate that little, if any, diacyl peroxide would be formed, much less, the amount needed to initiate and sustain a polymerization reaction. For example, similar experiments using acid chlorides, which also hydrolyze readily in water, in place of the above-described acid anhydride resulted in no polymerization reaction occurring.

The temperature at which polymerization of the above-described monomeric materials is conducted can, of course, vary over a wide range. The particular temperatures used will depend on the particular material polymerized and the properties of the polymer desired since, as stated heretofore, the polymerization temperature affects the properties of the polymer. Generally, such polymerizations are conducted at temperatures of from about 0° C. to about 95° C. With particular reference to the polymerization of vinyl chloride and the copolymerization of vinyl chloride with other copolymerizable monomers, e.g., vinyl acetate or vinylidene chloride, polymerization temperatures typically range from about 20° C. to about 70° C.

In conducting the polymerization of monomeric materials, as described above, the amount of acid anhydride and peracid or hydrogen peroxide introduced into the polymerization vessel is chosen to produce or generate a theoretical amount of diacyl peroxide, i.e., assuming (1) that all of the acid anhydride introduced into the vessel reacts with an equimolar amount of the peracid similarly introduced; or (2) that one-half of the acid anhydride introduced reacts first with hydrogen peroxide to produce the theoretical peracid, which, in turn, reacts with the remaining one-half of the anhydride to form the corresponding diacyl peroxide. In view of the competing hydrolysis reactions, it is believed that not all of the acid anhydride and peracid introduced is available to form the corresponding diacyl peroxide.

The theoretical yield of diacyl peroxide useful in the polymerization process typically varies from about 0.001 to about 1.0 weight percent, preferably from about 0.01 to about 0.05 weight percent, based on the total amount of monomer or monomeric material used. More generally, the amount of diacyl peroxide which is required to initiate the polymerization reaction is commonly referred to as an initiating amount.

In conducting the process of the present invention, acid anhydride and peroxygen compound, i.e., hydrogen peroxide or peracid are introduced simultaneously or in any sequential order into the polymerization vessel, i.e., into the medium in which the polymerization is conducted. Preferably, the aforementioned compounds are introduced separately; however, they may be mixed momentarily before introduction for convenience, e.g., charging to the vessel through one inlet port. Premixing at room temperature, will result in some reaction and loss of available free radicals from the diacyl peroxide. More typically, the peroxygen compound and acid anhydride are introduced separately but simultaneously into the polymerization vessel. The acid anhydride can be introduced first into the polymerization vessel followed by the peroxygen compound, or vice versa. Further, since polymerization is not initiated until both the acid anhydride and peroxygen compound are present in the polymerization vessel, it is possible to first feed one of the reactant components, i.e., the acid anhydride or peroxygen compound to the polymerization vessel, charge the monomer or monomeric material to the vessel and then introduce the other reactant component. The reactant component last charged to the vessel can be charged with the monomer. The manner of addition of the acid anhydride or peroxygen compound to the polymerization medium is not critical to the practice of the present process. Thus, the initiator reactant components can be introduced all at once or metered in continuously or intermittently, diluted with a suitable solvent or diluent, or in undiluted form. By suitable solvent or diluent is meant any material that does not affect the stability of the acid anhydride or peroxygen compound or deleteriously affect the polymerization of the monomer(s) being polymerized or the properties of the polymer product. While reference is made to polymerization vessels, etc., it is not intended that the use of the present initiator system be limited thereto. Thus, the system can be used in any container wherein initiators are required, e.g., molds, lay-ups, etc.

As mentioned, much of the commercial polymerizations of the above-described monomers occur in an aqueous polymerization medium to which has been added an emulsifying or suspending agent. Such agents aid in suspending or dispersing the polymer particles in the aqueous medium as they are formed, i.e., to form a latex or slurry type effluent, usually having 35 percent or more dispersed solids, that is discharged from the polymerization vessel.

The particular suspending agent used in the practice of the present process is not critical. Such materials can be non-ionic, cationic or anionic, as well as mixtures thereof. Examples of anionic agents are the sodium salts of sulfated or sulfonated hydrocarbons and fatty acids, such as dioctyl sodium sulfosuccinate, sodium dodecylbenzenesulfonate, sodium decylbenzenesulfonate, ammonium laurylbenzenesulfonate, potassium stearylbenzenesulfonate, potassium myristylnaphthalenesulfonate, potassium oleate, ammonium laurate, sodium laurate; sulfonated diesel oil and sodium lauryl sulfate (Duponol ME), sodium alkylnaphthalenesulfonate (Ketal BX-78), sodium salt of sulfated alkylphenoxypolyoxyethylene (Alipol CO-433), ammonium dodecylphenoxypolyoxyethylene ethyl sulfate, nonylphenoxy acetic acid, sulfated cresylic acid, disodium-N-octadecylsulfosuccinamate, tetrasodium-N-(1,2-dicarboxyethyl)-N-octadecylsulfosuccinamate, diamyl ester of sodium sulfosuccinic acid, dihexyl ester of sodium sulfosuccinic acid, bis(tridecyl) ester of sodium sulfosuccinic acid, dioctyl sodium sulfosuccinate, sodium dodecyl diphenyl oxide disulfonate, benzene potassium sulfonate, sodium salt of a sulfonated naphthalene-formaldehyde condensate, sodium salt of polyethoxy alkyl phenol sulfonate, sodium oleyl methyl tartrate and triethanolamine salt of polyethoxy alkyl phenol sulfonate and complex organic phosphates (Gafac RE-610). Examples of cationic agents are quaternary ammonium compounds, such as stearamidopropyl dimethyl-betahydroxyethyl ammonium nitrate, cetyl pyridinium chloride and cetyl trimethylammonium bromide.

Examples of non-ionic agents are high molecular weight polymers of propylene oxide and ethylene oxide, nonylphenoxypoly(ethyleneoxy)ethanols (Igepal CO-630 and CO-880), polyoxyethylated fatty alcohol (Emulphor ON-870), alkyl aryl polyether alcohols, such as lauryl phenyl polyether ethanol, alkanolamine fatty acid condensates, such as triethanolamine coconut fatty acid ethanolamide, lauric acid propanolamide, fatty alcohol polyglycol ether, myristyl phenol polyglycol ether, polyoxyethylene monooleate, polyoxyethylene sorbitol septaoleate, polyoxyethylene sorbitol oleate, laurate, polyoxyethylene cetyl alcohol, polyoxyethylene stearate, glycolamido stearate, and other polyoxyethylene alkanols and alkyl phenols containing from 2 to 40 moles of ethylene oxide per mole of alkanol or alkyl phenol.

Anionic suspending agents are preferred since they are more efficient in stabilizing the resultant polymer latex. Of these, some will be found being more useful than others, depending on the process conditions and the most suitable may be found by simple experimentation. Other suspending agents that can be used in the practice of the present process are protective colloids, such as gelatin, methyl cellulose, gum tragacanth and completely or partially hydrolyzed polyvinyl acetates. Other agents include hydroxylated phosphatides of soybean oil complex (Hydroxy Lecithin).

The amount of suspending agent used typically varies from 0.3 to 5 percent, based on the weight of the polymerizable monomers, although greater or lesser amounts can be used in some circumstances since the efficiencies of individual agents vary. The suspension of the monomer in the aqueous medium can be formed by any suitable means, such as by stirring or agitating the monomer, water and suspending agent, together in a vessel.

In a further embodiment of the present method, at least one further organic free-radical initiator that generates free radicals under the polymerization conditions used is introduced into the polymerization medium in addition to the acid anhydride and peroxygen compound, i.e., the peracid or hydrogen peroxide. In the most preferred application of the present process, a free-radical initiator having a good efficiency of free-radical generation at temperatures approximating the desired polymerization temperature is used. Such temperature is typically above that at which the diacyl peroxide (theoretically generated by the acid anhydride and peroxygen compound) has a high efficiency. For example, utilization of isobutyric anhydride and peracetic acid or hydrogen peroxide theoretically results in the formation of acetyl isobutyryl peroxide or diisobutyryl peroxide respectively which have a high free-radical generation efficiency at a temperature range of from about 30° C. to 40° C. In combination therewith, an organic peroxy compound having a high free-radical generation efficiency at about 45°–55° C., such as the dialkyl peroxydicarbonates, e.g., diisopropyl peroxydicarbonate, can be used. Thus, the polymerization is initiated substantially immediately with the anhydride-peroxygen compound components and sustained thereby until the temperature at which the further organic free-radical initiator is efficient is reached. In this manner, polymerization is initiated at the beginning of the polymerization cycle and continued smoothly until completion.

By proper choice of initiator components, i.e., by balancing the reactivities of the theoretical diacyl peroxide(s) generated and the further organic free-radical initiator, free-radical generation can be maintained fairly evenly over substantially the entire polymerization cycle. Thus, as the rate of free-radical generation from the diacyl peroxide source starts to decline, the rate of free-radical generation from the further free-radical initiator compound, e.g., the peroxycarbonate, starts to increase since, at that point in the cycle, the temperature of the polymerization medium will have increased to a temperature at which such further free-radical initiator is more efficient. The end result is a smooth and continuous polymerization of generally shorter cycle times than by the use of individual free-radical initiators. The reactivities of organic peroxides can be easily approximated by investigating the decomposition kinetics in a suitable solvent, such as mineral spirits. Reactivities of most commercially available organic peroxides are published in the literature in terms of half-life values at various temperatures.

The amount of further organic free-radical initiator, e.g., peroxydicarbonate, used will vary and will depend upon the theoretical amount of diacyl peroxide generated, i.e., the amount of acid anhydride and peroxygen compound used. Typically, however, from about 0.001 to about 0.50 weight percent of further free-radical initiator, based on the total amount of monomer, is employed. The further organic free-radical initiator compound can be introduced into the polymerization medium at any time. Thus, it can be introduced separately or along with the acid anhydride, the peroxygen compound, the monomer or the water or solvent, if used. In addition, it can be metered separately into the polymerization vessel during the polymerization, e.g., after polymerization has been commenced and near exhaustion of the diacyl peroxide. Preferably, the further free-radical initiator is introduced admixed with the acid anhydride or the peracid.

Of the further free-radical initiators that can be added to the polymerization vessel, there can be mentioned dialkyl peroxydicarbonates, tertiarybutyl peroxyesters, e.g., tertiarybutyl perpivalate, tertiarybutyl perbenzoate, ditertiarybutyl diperphthalalte and tertiary-butyl perneodecanoate; other diacyl peroxides, e.g., lauroyl peroxide, benzoyl peroxide, 2,4-dichlorobenzoyl peroxide and acetyl benzoyl peroxide; ketone peroxides, e.g., methyl ethyl ketone peroxide, cyclohexanone peroxide and methyl amyl ketone peroxide; organic hydroperoxides, e.g., cyclohexyl hydroperoxide, cumene hydroperoxide and tertiarybutyl hydroperoxide; and non-peroxidic initiators, e.g., azo-bis-isobutyronitrile. Preferably, such initiators are preformed.

The dialkyl peroxydicarbonates can be represented by the formula,

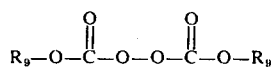

wherein $R_9$ is an aliphatic radical of from 1 to 20, preferably 2 to 12 carbon atoms or an aromatic radical of from 6 to 8 carbon atoms. Examples of aliphatic and aromatic radicals include: methyl, ethyl, n-propyl, isopropyl, n-butyl, isobutyl, secondary butyl, tertiarybutyl, capryl, 2-ethylhexyl, benzyl, undecyl, cyclohexyl and 4-tertiarybutyl cyclohexyl. Peroxydicarbonate esters are well known in the art and several are available in commercial quantities. Peroxydicarbonate esters are prepared typically by the careful reaction of the corresponding alkylchloroformate with aqueous sodium peroxide at low temperatures, e.g., 0°-10°C., as described, for example, in the *Journal of American Chemical Society*, Volume 72, page 1254 (1950), and in U.S. Pat. No. 2,370,588.

In a further embodiment, the further organic free-radical initiator can be introduced into the polymerization medium mixed with the acid anhydride or the peracid, preferably the acid anhydride. Such novel mixtures permit the utilization of the present method with existing organic free-radical initiator techniques in a safe and efficient manner since it only requires the further addition of only one more reagent to the polymerization vessel. For example, a mixture of diisopropyl peroxydicarbonate and isobutyric anhydride can be added to the polymerization vessel with peracetic acid or hydrogen peroxide (separately). Such reagents would provide acetyl isobutyryl peroxide or diisobutyryl peroxide respectively and diisopropyl peroxydicarbonate as the dual initiator system. The amount of each component in the initiator mixture, i.e., acid anhydride — organic free-radical initiator or peracid — organic free-radical initiator, will vary, of course, depending on the requirements of the polymerization being conducted, i.e., the amount of each reagent required in the system. Generally, the mole ratio of acid anhydride or peracid to the organic free-radical initiator will vary from 0.05:1 to 50:1. Preferably, the mole ratio will be from about 0.1:1 to 20:1.

The present process is more particularly described in the following examples which are intended as illustrative only since numerous modifications and variations therein will be apparent to those skilled in the art.

EXAMPLE I

Standard twenty-eight (28) fluid ounce polymerization bottles were filled with 300 grams of demineralized and distilled water, 0.3 grams of Methocel 65 HG-50 suspending agent and 0.05 grams of sodium bicarbonate. The contents of the bottles were frozen and, thereafter, 100 grams of liquid vinyl chloride and 0.02 parts per 100 parts of vinyl chloride monomer of di-n-propyl peroxydicarbonate (NPP) were charged to each of the bottles. The bottles were capped and placed in a constant temperature bath maintained at 50°C. where they were tumbled to agitate the contents. At various intervals, a bottle was removed from the polymerization bath, the polymerization shortstopped and the contents analyzed for percent conversion of vinyl chloride monomer to polyvinyl chloride. The results of such analyses are tabulated in Table I. The polyvinyl chloride product was filtered, washed with water and methanol and then dried in a vaccum oven at 50° C.

EXAMPLE II

The procedure of Example I was repeated except that 0.02 parts of diisopropyl peroxydicarbonate (per 100 parts of vinyl chloride monomer) were employed in place of the di-n-propyl peroxydicarbonate and 150 grams of vinyl chloride monomer were used in place of the 100 grams used with di-n-propyl peroxydicarbonate. The results of the analyses for percent monomer converted at the various sample times are tabulated also in Table I.

TABLE I

| Di-n-propyl Peroxydicarbonate | | Diisopropyl Peroxydicarbonate | |
|---|---|---|---|
| Time, hrs. | % Conversion | Time, hrs. | % Conversion |
| 2 | 3 | 2 | 6.7 |
| 4 | 15 | 4 | 20.7 |
| 6 | 34 | 8.5 | 57.3 |
| 9 | 73 | 12 | 78.0 |
| 16 | 87 | 17+ | 86.7 |

Examples I and II illustrate typical vinyl chloride bottle polymerizations with dialkyl peroxydicarbonates.

EXAMPLE III

The procedure of Example I was repeated except that $8.15 \times 10^{-4}$ moles of isobutyric anhydride, $8.15 \times 10^{-4}$ moles of peracetic acid and $6 \times 10^{-3}$ moles of sodium bicarbonate were added to the polymerization bottles to initiate the polymerization of the vinyl chloride monomer. Such amounts of anhydride and peracid theoretically generate 0.12 parts of acetyl isobutyryl peroxide per one hundred parts of vinyl chloride monomer (phm). The results of this polymerization are recorded in Table II and graphically illustrated in the attached figure by the curve following the points represented by black dots.

TABLE II

| Isobutyric Anhydride and Peracetic Acid | |
|---|---|
| Time, hrs. | % Conversion |
| 2 | 23 |
| 4 | 47 |
| 6 | 54 |
| 9 | 62 |
| 16.5 | 74 |

The data of Example III show that vinyl chloride can be polymerized by the combined use of an acid anhydride, i.e., isobutyric anhydride, and a peracid, i.e., peracetic acid. The data further show that conversions of vinyl chloride to polyvinylchloride are higher than the dialkyl peroxydicarbonates of Example I during the early stages of the polymerization cycle, but that the rate of conversion with the anhydride — peracid system falls off after about four hours.

EXAMPLE IV

Run A

The procedure of Example I was repeated except that $0.97 \times 10^{-4}$ moles of di-n-propyl peroxydicarbonate (NPF), $4.08 \times 10^{-4}$ moles of isobutyric anhydride, $4.08 \times 10^{-4}$ moles of peracetic acid and $3 \times 10^{-3}$ sodium bicarbonate were introduced into the polymerization bottles to initiate the polymerization of vinyl chloride. The aforesaid amounts of anhydride and peracid theoretically generate 0.06 parts of acetyl isobutyryl peroxide per 100 parts of vinyl chloride monomer (phm).

Run B

The procedure of Run A was repeated except that $0.485 \times 10^{-4}$ moles of di-n-propyl peroxydicarbonate, $8.15 \times 10^{-4}$ moles of isobutyric anhydride, $8.15 \times 10^{-4}$ moles of peracetic acid and $6 \times 10^{-3}$ moles of sodium bicarbonate were used.

Run C

The procedure of Run A was repeated except that the amount of di-n-propyl peroxydicarbonate used was $0.485 \times 10^{-4}$ moles.

The results of Runs A, B and C are tabulated in Table III and graphically illustrated in the attached figure by the curves following points represented by triangle, squares and hexagons respectively.

TABLE III

Run A

| Initiator System | Moles × 10⁴ | Time, hrs. | % Conversion |
|---|---|---|---|
| NPP | 0.97 | 2 | 18 |
| Isobutyric Anhydride | 4.08 | | |
| Peracetic Acid | 4.08 | 4 | 42 |
| Sodium Bicarbonate | 30 | | |
| | | 6 | 74 |
| | | 9 | 90 |
| | | 16 | 92 |

Run B

| Initiator System | Moles × 10⁴ | Time, hrs. | % Conversion |
|---|---|---|---|
| NPP | 0.485 | 2 | 35 |
| Isobutyric Anhydride | 8.15 | | |
| Peracetic Acid | 8.15 | 4 | 54 |
| Sodium Bicarbonate | 60 | | |
| | | 6 | 87 |
| | | 9 | 92 |
| | | 16 | 92 |

Run C

| Initiator System | Moles × 10⁴ | Time, hrs. | % Conversion |
|---|---|---|---|
| NPP | 0.485 | 2 | 16 |
| Isobutyric Anhydride | 4.08 | | |
| Peracetic Acid | 4.08 | 4 | 40 |
| Sodium Bicarbonate | 30 | | |
| | | 6 | 52 |
| | | 9 | 85 |
| | | 16 | 89 |

The data of Example IV show that vinyl chloride can be polymerized in a smooth continuous manner by the use of a multi-initiator system, e.g., a dual initiator system of a dialkyl peroxydicarbonate (NPP) and and acid anhydride (isobutyric anhydride) and peracid (peracetic acid). The data further show that the rate of polymerization in at least the first half of the polymerization cycle can be regulated by controlling the amount of each initiator system used. Therefore, the present system is sufficiently flexible to accommodate the various kettle cooling capacities to the polymer industry.

EXAMPLE V

The procedure of Example I was repeated. After 4, 6 and 16 hours polymerization time, 16, 38 and 90 percent, respectively, of the vinyl chloride charge was found to have been converted.

The results of Examples III – V are graphically illustrated on the attached figure. These results show that the combined use of a dialkyl peroxydicarbonate, isobutyric anhydride and peracetic acid can produce monomer conversions of as much as 90 percent in as little as seven hours as compared to 50 percent conversion in seven hours using the dialkyl peroxydicarbonate only. The graph also demonstrates that the polymerization cycle time obtained with the use of dialkyl peroxydicarbonates alone can be significantly reduced by the use of the dual initiator system described and that very smooth polymerizations are attained.

EXAMPLE VI

The experimental procedure of Example I was repeated except that 150 grams of vinyl chloride monomer were used and $17 \times 10^{-4}$ moles of acetic anhydride, $23 \times 10^{-4}$ moles of peracetic acid and $6 \times 10^{-3}$ moles of sodium bicarbonate were used to initiate the polymerization of the vinyl monomer. After 16 hours polymerization time, 33 percent of the vinyl chloride charge was converted to polymer.

EXAMPLE VII

The experimental procedure of Example I was repeated except that $8.15 \times 10^{-4}$ moles of n-butyric anhydride, $8.15 \times 10^{-4}$ moles of peracetic acid and $6.0 \times 10^{-3}$ moles of sodium bicarbonate were used to initiate the polymerization. After 16 hours polymerization time, 57 percent of the monomer had been polymerized.

EXAMPLE VIII

The experimental procedure of Example I was repeated except that $8.15 \times 10^{-4}$ moles of pivalic anhydride, $8.15 \times 10^{-4}$ moles of peracetic acid and $6 \times 10^{-3}$ moles of sodium bicarbonate were used to initiate the polymerization and the temperature was maintained at 20° C. After 16 hours polymerization time, 13 percent of the monomer was polymerized.

EXAMPLE IX

The experimental procedure of Example I was followed except that $8.15 \times 10^{-4}$ moles of acetic anhydride, $8.15 \times 10^{-4}$ moles of perisobutyric acid and $6 \times 10^{-3}$ moles of sodium bicarbonate were used to initiate the polymerization. After 16 hours polymerization time, 92 percent of the monomer was converted to polymer.

EXAMPLE X

The experimental procedure of Example I was repeated except that $8.15 \times 10^{-4}$ moles of isobutyric anhydride, $8.15 \times 10^{-4}$ moles of perisobutyric acid and $6 \times 10^{-3}$ moles of sodium bicarbonate were used to initiate the polymerization. After 16 hours polymerization time, 92 percent of the monomer was polymerized.

EXAMPLE XI

The experimental procedure of Example I is followed except that $0.485 \times 10^{-4}$ moles of di-2-ethylhexyl peroxydicarbonate, $4.08 \times 10^{-4}$ moles of isobutyric anhydride, $4.08 \times 10^{-4}$ moles of peracetic acid and $6 \times 10^{-3}$ moles of sodium bicarbonate are used to initiate the polymerization. Conversions similar to those obtained in Example IV are obtained.

EXAMPLE XII

The experimental procedure of Example I is followed except that $0.485 \times 10^{-4}$ moles of di-2-ethylhexyl peroxydicarbonate, $4.08 \times 10^{-4}$ moles of acetic anhydride, $4.08 \times 10^{-4}$ moles of perisobutyric acid and $6 \times 10^{-3}$ moles of sodium bicarbonate are used to initiate the polymerization. Conversions similar to those of Example IV are obtained.

EXAMPLE XIII

The procedure of Example I is followed except that $8.77 \times 10^{-4}$ moles of lauroyl peroxide, $4.08 \times 10^{-4}$ moles of isobutyric anhydride, $4.08 \times 10^{-4}$ moles of peracetic acid and $6 \times 10^{-3}$ moles of sodium bicarbonate are used to initiate the polymerization. Satisfactory conversions of monomer are obtained in 12–16 hours polymerization time.

EXAMPLE XIV

The procedure of Example I is followed except that $2.16 \times 10^{-4}$ moles of tertiarybutyl peroxypivalate, $4.08 \times 10^{-4}$ moles of isobutyric anhydride, $4.08 \times 10^{-4}$ moles of peracetic acid and $6 \times 10^{-3}$ moles of sodium bicarbonate are used to initiate the polymerization. After 12 – 16 hours of polymerization time, satisfactory conversions are obtained.

EXAMPLE XV

The experimental procedure of Example I was repeated except that $8.15 \times 10^{-4}$ moles of isobutyric anhydride, $8.15 \times 10^{-4}$ moles of peracetic acid and $6 \times 10^{-3}$ moles of sodium bicarbonate were used to initiate the polymerization of the vinyl monomer and the reaction was conducted at 30° C. After 4, 6, 9 and 17.5 hours of polymerization time, the conversions of monomer were 6, 24, 62 and 88 percent respectively.

EXAMPLE XVI

The experimental procedure of Example I was repeated except that $8.15 \times 10^{-4}$ moles of isobutyric anhydride, $8.15 \times 10^{-4}$ moles of peracetic acid and $6 \times 10^{-3}$ moles of sodium bicarbonate were used to initiate the polymerization of the vinyl monomer and the polymerization was conducted at 40° C. After 2, 4, 6, 9 and 16 hours, the conversions of monomer were 12, 41, 65, 92 and 93 percent respectively.

EXAMPLE XVII

Standard twenty eight (28) fluid ounce polymerization bottles were filled with 300 grams of demineralized and distilled water, 0.3 grams of Methocel 65 HG-50 suspending agent, and 0.05 grams of sodium bicarbonate. The contents of the bottles were frozen and thereafter, 100 grams of liquid vinyl chloride and the initiator components used to initiate the polymerization of the vinyl chloride were charged to each of the bottles. The bottles were capped and placed in a constant temperature bath maintained at 50° C. wherein they were tumbled to agitate the contents. At a predetermined time, the bottles were removed from the polymerization bath and the polymerization short stopped. The amounts of polymer produced was determined by either recovering the polymer product or by measuring the weight of unreacted monomer remaining in the bottle. The particular initiator components tested, the amount of initiator used, the polymerization time, and the amount of polymer produced (as percent conversion of monomer to polymer) are tabulated in Table IV.

TABLE IV

| | VINYL CHLORIDE POLYMERIZATION AT 50° C. | | |
|---|---|---|---|
| EXPERIMENTAL RUN NO. | INITIATOR COMPONENTS | AMOUNT, MOLES × 10⁴ | CONVERSION AFTER TIME, HRS./PERCENT |
| 1. | Peracetic Acid | 23.0 | 16   3.3 |
| 2. | NPP[a] | 0.97 | 6   41 |
| 3. | NPP<br>Isobutyric Anhydride | 0.97<br>4.08 | 6   43 |
| 4. | NPP<br>Isobutyric Anhydride<br>Sodium Bicarbonate | 0.97<br>4.08<br>30 | 6   41 |
| 5. | NPP<br>Isobutyric Anhydride<br>Sodium Bicarbonate<br>Peracetic Acid | 0.97<br>4.08<br>30<br>4.08 | 6   74 |

[a]Di-n-propyl peroxydicarbonate

The date of Table IV show that peracetic acid is a poor initiator for the polymerization of vinyl chloride (Run 1); and that the combination of isobutyric anhydride with NPP (di-n-propyl peroxydicarbonate) produces an amount of polymer that is statistically the same as the amount of polymer produced with NPP alone (Run 2, 3 and 4). However, the data of Table IV also show that when peracetic acid and isobutyric anhydride are used in combination with NPP, a significant increase in the amount of polymer produced results.

EXAMPLE XVIII

Standard twenty-eight (28) fluid ounce polymerization bottles were filled with 300 grams of demineralized and distilled water, 0.3 grams of Methocel No. 65 HG-50 suspending agent, and 0.05 grams of sodium bicarbonate. The contents of the bottles were frozen and, thereafter, 100 grams of liquid vinyl chloride and the initiator components used to initiate the polymerization of the vinyl chloride were charged to each of the bottles. The bottles were capped and placed in a constant temperature bath maintained at 40° C. wherein they were tumbled to agitate the contents. At the end of 6 hours, the bottles were removed from the polymerization bath. The amount of polymer produced was determined by measuring the weight of unreacted monomer remaining in the bottle. The particular initiator components tested, the amount of initiator used and the amount of polymer produced (as percent conversion of monomer to polymer) are tabulated in Table V.

polyvinyl chloride. Table VI lists the particular initiator or initiator system used, the amount used and the percent conversion. The order of addition of initiator system components is as listed in Table VI.

TABLE VI

| Run | Material | Amount | Conversion, % |
|---|---|---|---|
| 1. | Dibenzoyl Peroxide | 1.0 phm.[a] | 39.5 |
| 2. | Dibenzoyl Peroxide<br>Isobutyric Anhydride | 1.0 phm.<br>$8 \times 10^{-4}$ moles | 39.0 |
| 3. | Dibenzoyl Peroxide<br>Isobutyric Anhydride<br>Peracetic Acid | 1.0 phm.<br>$8 \times 10^{-4}$ moles<br>$8 \times 10^{-4}$ moles | 39.2 |
| 4. | Dibenzoyl peroxide<br>Isobutyric Anhydride<br>Peracetic Acid<br>Triton B Surfactant | 1.0 phm.<br>$8 \times 10^{-4}$ moles<br>$8 \times 10^{-4}$ moles<br>$8 \times 10^{-4}$ moles | 57.6 |
| 5. | Di-n-propyl peroxydicarbonate | 0.025 phm. | 53.2 |
| 6. | Isobutyric Anhydride<br>Peracetic Acid<br>Triton B Surfactant | $8 \times 10^{-4}$ moles<br>$8 \times 10^{-4}$ moles<br>$8 \times 10^{-4}$ moles | 54.6 |

[a]Parts per hundred parts of monomer.

The data of Table VI show that in a bulk polymerization the combination of isobutyric anhydride with dibenzoyl peroxide (Run 2) produces an amount of polymer that is about the same as the amount of polymer

TABLE V

VINYL CHLORIDE POLYMERIZATION AT 40° C.

| Experimental Run No. | Initiator Components | Amount Moles × 10⁴ | % Conversion After 6 hours |
|---|---|---|---|
| 1. | Dibenzoyl Peroxide | 8 | 0 |
| 2. | Dibenzoyl Peroxide<br>Isobutyric Anhydride | 8<br>8 | 0[a] |
| 3. | Dibenzoyl Peroxide<br>Isobutyric Anhydride<br>Sodium Bicarbonate | 8<br>8<br>80 | 0[a] |
| 4. | Potassium Persulfate | 8 | 0 |
| 5. | Potassium Persulfate<br>Isobutyric Anhydride | 8<br>8 | 0[a] |
| 6. | Potassium Persulfate<br>Isobutyric Anhydride<br>Sodium Bicarbonate | 8<br>8<br>80 | 1 |
| 7. | Peracetic Acid<br>Isobutyric Anhydride<br>Sodium Bicarbonate | 8<br>8<br>80 | 49 |

[a]A trace of polyvinyl chloride was visible; but was not measurable.

The data of Table V show that neither dibenzoyl peroxide nor potassium persulfate produced any visible polyvinyl chloride product (Runs 1 and 4). Moreover, the use of dibenzoyl peroxide or potassium persulfate each in combination with isobutyric anhydride, or the use of dibenzoyl peroxide or potassium persulfate each in combination with isobutryic anhydride and further sodium bicarbonate did not result in any significant increase in the amount of polymer produced than when dibenzoyl peroxide and potassium persulfate were used alone. In contrast, the data show that when an initiating system of peracetic acid and isobutyric anhydride was used under the same polymerization conditions, 49 percent of the vinyl chloride was converted to polymer.

EXAMPLE XIX

To empty standard twenty-eight (28) fluid ounce polymerization bottles chilled to about −10° F. was added the initiator or initiator system used to polymerize vinyl chloride monomer. Thereafter, 100 grams of liquid vinyl chloride were charged to each of the bottles. The bottles were capped and placed in a constant temperature bath maintained at 40° C. and tumbled therein for 16 hours. At the end of the polymerization period, the bottles were removed from the bath and the contents analyzed for percent conversion of vinyl chloride to produced with dibenzoyl peroxide alone (Run 1). The data further show that an initiator system of the present invention (Run 6) provides a conversion of about 55 percent at the conditions listed and indicates that with further balancing of the amounts used of the preformed organic free-radical initiator and the initiator system, conversions higher than 57.6 percent can be obtained.

EXAMPLE XX

The polymerization of Example XIX, Run 6 was repeated twice except that the polymerization was terminated after only 3 hours. The amount of vinyl chloride polymerized was 19 and 17 percent in these runs. This data shows that at the polymerization conditions used, about one-third of the polymer produced after 16 hours (Example XIX, Run 6) was produced in the first 3 hours of polymerization.

EXAMPLE XXI

Standard 28 fluid ounce polymerization bottles were filled with 300 grams of demineralized and distilled water, 0.3 grams of Methocel, 65 HG-50 suspending agent, and 0.05 grams of sodium bicarbonate. The contents of the bottles were frozen and thereafter 100 grams of liquid vinyl chloride, $8.0 \times 10^{-4}$ moles of isobutyric anhydride, $4.0 \times 10^{-4}$ moles of hydrogen peroxide, and $4.0 \times 10^{-3}$ moles of sodium bicarbonate were charged to each of the bottles. The bottles were capped and placed in a constant temperature bath maintained at 30° C. where they were tumbled to agitate the contents. At various intervals, a bottle was removed from the polymerization bath, the polymerization short-stopped, and the contents analyzed for percent conversion of vinyl chloride monomer to polyvinyl chloride. The polyvinyl chloride product was filtered, washed with water and methanol, and then dried in a vacuum oven at 50° C. Table VII lists the percent of monomer converted at the various sample times.

EXAMPLE XXII

The experimental procedure of Example XXI was repeated except that the polymerization temperature was 40° C. The results are tabulated in Table VII.

EXAMPLE XXIII

The experimental procedure of Example XXI was repeated except that $4.0 \times 10^{-4}$ moles of isobutyric anhydride, $2.0 \times 10^{-4}$ moles of hydrogen peroxide, and $2.0 \times 10^{-3}$ moles of sodium bicarbonate were used to initiate the polymerization. The results are tabulated in Table VII.

EXAMPLE XXIV

The experimental procedure of Example XXIII was repeated except that the polymerization was conducted at 40° C. The results are tabulated in Table VII.

EXAMPLE XXV

The experimental procedure of Example XXI was repeated except that $16.0 \times 10^{-4}$ moles of isobutyric anhydride, $8.0 \times 10^{-4}$ moles of hydrogen peroxide, and $8.0 \times 10^{-4}$ moles of sodium bicarbonate were used to initiate the polymerization which was conducted at 50° C. The results are tabulated in Table VII.

EXAMPLE XXVI

The experimental procedure of Example XXI was repeated except that $30 \times 10^{-4}$ moles of acetic anhydride, $15 \times 10^{-4}$ moles of hydrogen peroxide, and $15 \times 10^{-3}$ moles of sodium bicarbonate were used to initiate the polymerization at 50°C. After 16 hours polymerization time, 7 percent of the vinyl chloride was polymerized.

The results of Example XXVI indicate that the polymerization temperature used was not high enough for efficient use of the initiator, diacetyl peroxide.

EXAMPLE XXVII

The experimental procedure of Example XXI was repeated except that $16.0 \times 10^{-4}$ moles of n-butyric anhydride, $8.0 \times 10^{-4}$ moles of hydrogen peroxide, and $8.0 \times 10^{-3}$ moles of sodium bicarbonate were used to initiate the polymerization at 50°C. After 16 hours, 91% of the vinyl chloride was polymerized.

EXAMPLE XXVIII

The experimental procedure of Example XXI was repeated except that $16.3 \times 10^{-4}$ moles of pivalic anhydride, $8.15 \times 10^{-4}$ moles of hydrogen peroxide, and $8.15 \times 10^{-3}$ moles of sodium bicarbonate were used to initiate the polymerization. After 16 hours at 20°C., 3 percent of the vinyl chloride was polymerized.

The results of Example XXVIII indicate that the conditions were unfavorable for efficient formation and use of dipivaloyl peroxide.

EXAMPLE XXIX

The experimental procedure of Example XXI was repeated except that $8.0 \times 10^{-4}$ moles of isobutyric anhydride, $8.0 \times 10^{-4}$ moles of acetic anhydride, $8.0 \times 10^{-4}$ moles of hydrogen peroxide, and $8.0 \times 10^{-3}$ moles of sodium bicarbonate were used to initiate the polymerization at 50°C. After 16 hours, 84 percent of the vinyl chloride was polymerized.

TABLE VII

Polymerization of Vinyl chloride

| Example | Material | $(\times 10^4)$ Moles | Temperature, °C. | Polymerization Time, Hours | Vinyl Chloride Conversion, % |
|---|---|---|---|---|---|
| XXI | Isobutyric |  | 30 | 16 | 91 |
|  | Anhydride | 8.0 |  | 9 | 66 |
|  | $H_2O_2$ | 4.0 |  | 6 | 37 |
|  | $NaHCO_3$ | 40 |  | 4 | 19 |
|  |  |  |  | 2 | 5 |
| XII | Isobutyric |  | 40 | 16 | 89 |
|  | Anhydride | 8.0 |  | 9 | 67 |
|  | $H_2O_2$ | 4.0 |  | 6 | 56 |
|  | $NaHCO_3$ | 40 |  | 4 | 38 |
|  |  |  |  | 2 | 11 |
| XXIII | Isobutyric |  | 30 | 16 | 59 |
|  | Anhydride | 4.0 |  | 9 | 32 |
|  | $H_2O_2$ | 2.0 |  | 6 | 16 |
|  | $NaHCO_3$ | 20 |  |  |  |
| XXIV | Isobutyric |  | 40 | 16 | 38 |
|  | Anhydride | 4.0 |  | 9 | 31 |
|  | $H_2O_2$ | 2.0 |  | 6 | 21 |
|  | $NaHCO_3$ | 20 |  | 4 | 17 |
|  |  |  |  | 2 | 3 |
| XXV | Isobutyric | 16.0 | 50 | 16 | 92 |
|  | Anhydride |  |  | 6 | 92 |
|  | $H_2O_2$ | 8.0 |  | 4 | 84 |
|  | $NaHCO_3$ | 80 |  | 2 | 56 |

The data of Example XXI to XXV show that ethylenically unsaturated monomers, such as vinyl chloride, can be polymerized with the combined use of an acid anhydride, e.g., isobutyric anhydride, and hydrogen peroxide.

EXAMPLE XXX

The experimental procedure of Example XXI was repeated except that $8.0 \times 10^{-4}$ moles of isobutyric anhydride, $8.0 \times 10^{-4}$ moles of nbutyric anhydride, $8.0 \times$ $10^{-4}$ moles of hydrogen peroxide, and $8.0 \times 10^{-3}$ moles of sodium bicarbonate were used to initiate the polymerization at 50°C. After 16 hours, 92 percent of the vinyl chloride was polymerized.

EXAMPLE XXXI

The experimental procedure of Example XXI was repeated except that $0.97 \times 10^{-4}$ moles of di-n-propyl peroxydicarbonate, $6.0 \times 10^{-4}$ moles of isobutyric anhydride, $3.0 \times 10^{-4}$ moles of hydrogen peroxide, and $3 \times 10^{-3}$ moles of sodium bicarbonate were used to initiate the polymerization. The reaction was conducted at 50°C. After 2, 4, 6, 9 and 16 hours polymerization time, the conversions of monomer were 20, 41, 64, 90 and 92 percent respectively.

EXAMPLE XXXII

The experimental procedure of Example XXI was repeated except that $4.0 \times 10^{-4}$ moles of isobutyric anhydride, $16.0 \times 10^{-4}$ moles of propanoic anhydride, $10.0 \times 10^{-4}$ moles of hydrogen peroxide, and $10.0 \times 10^{-3}$ moles of sodium bicarbonate were used to initiate the polymerization at 50°C. After 16 hours, 91 percent of the vinyl chloride was polymerized.

EXAMPLE XXXIII

The experimental procedure of Example XXI was repeated except that $12.0 \times 10^{-4}$ moles of isobutyric anhydride, $6.0 \times 10^{-4}$ moles of hydrogen peroxide and $60 \times 10^{-4}$ moles of sodium bicarbonate were used to initiate the polymerization at 40°C. After 16 hours, 91 percent of the vinyl chloride was polymerized.

EXAMPLE XXXIV

The experimental procedure of Example XXXIII was repeated except that $12.0 \times 10^{-4}$ moles of Triton B (trimethyl benzylammonium hydroxide was used in place of the sodium bicarbonate. After 16 hours, 83 percent of the vinyl chloride was polymerized.

EXAMPLE XXXV

To standard twenty-eight (28) fluid ounce chilled polymerization bottles were added varying amounts of isobutyric anhydride (IBAN), hydrogen peroxide and either sodium bicarbonate or Triton B surfactant. Thereafter, 100 grams of liquid vinyl chloride monomer were charged to each of the bottles. The bottles were capped and placed in a constant temperature bath maintained at 40°C. After three hours, the bottles were removed from the polymerization bath, the polymerization short-stopped, and the contents analyzed for percent conversion of vinyl chloride to polyvinyl chloride. Table VIII lists the amount of reactants used and the percent of monomer converted.

TABLE VIII

| Run | Material | Amount Moles × 10⁴ | Conversion, % |
|---|---|---|---|
| 1 | IBAN | 12.0 | 0 |
|   | H₂O₂(2.8%) | 6.0 | |
|   | NaHCO₃ | 60 | |
| 2 | IBAN | 12.0 | 8 |
|   | H₂O₂(2.8%) | 6.0 | |
|   | Triton B | 12.0 | |
| 3 | IBAN | 16.0 | 39 |
|   | H₂O₂(35.6%) | 8.0 | |
|   | Triton B | 16.0 | |

The data of Table VIII show that the present initiator system can be used to bulk polymerize ethylenically unsaturated materials such as vinyl chloride.

Although the present process has been described with reference to specific details of certain embodiments thereof, it is not intended that such details should be regarded as limitations upon the scope of the invention except as and to the extent that they are included in the accompanying claims.

I claim:

1. In the process for polymerizing ethylenically unsaturated material susceptible to polymerization with free-radical type initiators in an aqueous or bulk polymerization medium, the improvement which comprises conducting said polymerization in the presence of an initiator system comprising, in combination, alkaline buffering reagent, organic acid anhydride represented by the general formula,

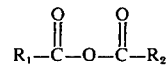

wherein $R_1$ and $R_2$ are each selected from the group consisting of substituted and unsubstituted $C_1$–$C_{20}$ alkyl, $C_6$–$C_{10}$ cycloalkyl and $C_6$–$C_{10}$ aryl radicals, and peroxygen compound selected from the group consisting of organic peroxy acid and hydrogen peroxide, said alkaline buffering reagent, acid anhydride and peroxygen compound being present in amounts sufficient to polymerize the ethylenically unsaturated material.

2. The process of claim 1 wherein the organic peroxy acid can be represented by the general formula,

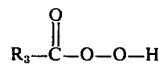

wherein $R_3$ is selected from the group consisting of substituted and unsubstituted $C_1$–$C_{20}$ alkyl and $C_6$–$C_{10}$ aryl radicals.

3. The process of claim 1 wherein from about 0.001 to about 3 weight percent of acid anhydride, based on the ethylenically unsaturated material, is used and the mole ratio of acid anhydride to peroxy acid is from about 0.1:1 to about 5:1.

4. The process of claim 1 wherein from about 0.001 to about 3 weight percent of acid anhydride, based on the ethylenically unsaturated material, is used and the mole ratio of hydrogen peroxide to acid anhydride is from about 0.1:1 to about 10.0:1.

5. The process of claim 1 wherein at least one further organic free-radical initiator is present during said polymerization.

6. The process of claim 5 wherein said further organic free-radical initiator generates free radicals efficiently at from 45°C. to about 80°C.

7. The process of claim 5 wherein said further organic free-radical initiator is selected from the group consisting of tertiarybutyl peroxyesters, diacyl peroxides, peroxydicarbonate esters and azo-bisisobutyronitrile.

8. The process of claim 7 wherein the further organic free-radical initiator is selected from the group consisting of tertiarybutyl perpivalate, tertiarybutyl perneodecanoate, lauroyl peroxide, benzoyl peroxide, azo-bis-isobutyronitrile, diisopropylperoxydicarbonate, di-n-propylperoxydicarbonate, di-sec-butylperoxydicarbonate, di-2-ethylhexylperoxydicarbonate, dicyclohexylperoxydicarbonate, di-4-tertiarybutyl cyclohexylperoxydicarbonate, and mixtures of such initiators.

9. The process of claim 1 wherein said unsaturated material is vinyl chloride.

10. The process of claim 1 wherein more than one acid anhydride is used.

11. The process of claim 10 wherein the acid anhydride is selected from the group consisting of isobutyric anhydride, propionic anhydride, acetic anhydride and mixtures of such anhydrides.

12. The process of claim 1 wherein the buffering reagent is sodium bicarbonate or quaternary ammonium hydroxide.

13. The process of claim 1 wherein the peroxy acid is peracetic acid.

14. In the process of polymerizing ethylenically unsaturated material susceptible to polymerization with free-radical type initiators in an aqueous or bulk polymerization medium, the improvement which comprises conducting said polymerization in the presence of an initiator system comprising, in combination, (a) alkaline buffering reagent, (b) organic acid anhydride represented by the general formula,

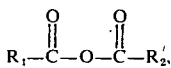

wherein $R_1$ and $R_2$ are each selected from the group consisting of substituted and unsubstituted $C_1 - C_{12}$ alkyl, $C_6 - C_{10}$ cycloalkyl and $C_6 - C_{10}$ aryl radicals, and (c) organic peroxy acid represented by the general formula,

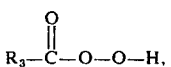

wherein $R_3$ is selected from the group consisting of $C_1 - C_{12}$ alkyl and $C_6 - C_{10}$ aryl radicals, said alkaline buffering reagent, acid anhydride and peroxy acid being present in amounts sufficient to polymerize the ethylenically unsaturated material.

15. The process of claim 14 wherein from about 0.001 to about 3 weight percent of acid anhydride, based on the ethylenically unsaturated monomer, is used and the mole ratio of acid anhydride to peroxy acid is from about 0.1:1 to about 5:1.

16. The process of claim 15 wherein the organic peroxy acid is peracetic acid.

17. The process of claim 15 wherein the acid anhydride is selected from the group consisting of isobutyric anhydride, propionic anhydride, acetic anhydride and mixtures of such anhydrides.

18. The process of claim 17 wherein the organic peroxy acid is peracetic acid.

19. The process of claim 18 wherein the alkaline buffering reagent is sodium bicarbonate or quaternary ammonium hydroxide and the ethylenically unsaturated material is vinyl chloride.

20. The process of claim 14 wherein a further organic free-radical initiator selected from the group consisting of tertiarybutyl peroxyesters, diacyl peroxides and peroxydicarbonate esters is present during said polymerization.

21. The process of claim 20 wherein said peroxydicarbonate esters can be represented by the general formula,

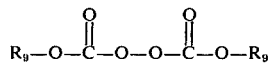

wherein $R_9$ is an aliphatic radical of from 2 to 12 carbon atoms or an aromatic radical of from 6 to 8 carbon atoms.

22. The process of claim 20 wherein from 0.001 to about 0.50 weight percent, based on the amount of unsaturated monomer, of said further organic free-radical initiator is used.

23. The process of claim 20 wherein from about 0.001 to about 0.50 weight percent of a further organic free-radical initiator selected from the group consisting of tertiarybutyl perpivalate, tertiarybutyl perneodecanoate, lauroyl peroxide, benzoyl peroxide, azobis-isobutyronitrile, diisopropylperoxydicarbonate, di-n-propylperoxydicarbonate, di-secbutylperoxydicarbonate, di-2-ethylhexylperoxydicarbonate, dicyclohexylperoxydicarbonate, di-4-tertiarybutyl cyclohexylperoxydicarbonate, and mixtures of such initiators is present during said polymerization.

24. The process of claim 14 wherein the monomer is vinyl chloride.

25. In the process for polymerizing ethylenically unsaturated material susceptible to polymerization with free-radical type initiators in an aqueous or bulk polymerization medium at from about 0°C. to about 90°C., the improvement which comprises introducing organic acid anhydride represented by the general formula,

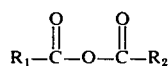

wherein $R_1$ and $R_2$ are each selected from the group consisting of substituted and unsubstituted $C_1-C_{12}$ alkyl, $C_6-C_{10}$ cycloalkyl and $C_6-C_{10}$ aryl radicals, organic peroxy acid and alkaline buffering agent into said polymerization medium each in amounts sufficient to generate, in situ diacyl peroxide in an amount sufficient to polymerize the ethylenically unsaturated material.

26. The process of claim 25 wherein the organic peroxy acid can be represented by the general formula,

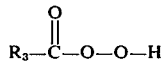

wherein $R_3$ is selected from the group consisting of substituted and unsubstituted $C_1-C_{12}$ alkyl and $C_6-C_{10}$ aryl radicals.

27. The process of claim 25 wherein from about 0.001 to about 3 weight percent of acid anhydride, based on the ethylenically unsaturated material, is used and the mole ratio of acid anhydride to peroxy acid is from about 0.1:1 to about 5:1.

28. The process of claim 25 wherein the acid anhydride is selected from the group consisting of isobutyric anhydride, propionic anhydride, acetic anhydride and mixtures of such anhydrides, and the peroxy acid is peracetic acid.

29. The process of claim 25 wherein the ethylenically unsaturated material is vinyl chloride.

30. The process of claim 25 wherein from 0.001 to about 0.50 weight percent, based on said monomer, of a further organic free-radical initiator, selected from the group consisting of tertiarybutyl peroxyesters, diacyl peroxides, peroxydicarbonate esters and azo-bis-isobutyronitrile, is present during said polymerization.

31. In the process of polymerizing vinyl chloride in an aqueous medium with a free-radical initiator, the improvement which comprises conducting the polymerization with an initiator system comprising:
a. from about 0.001 to about 3 weight percent, based on vinyl chloride, of acid anhydride represented by the general formula,

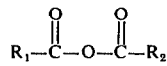

wherein $R_1$ and $R_2$ are each selected from the group consisting of $C_1 - C_{20}$ alkyl, $C_6 - C_{10}$ cycloalkyl and $C_6 - C_{10}$ aryl radicals,
b. organic peroxy acid represented by the formula,

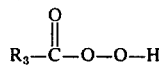

wherein $R_3$ is selected from the group consisting of $C_1 - C_{20}$ alkyl and $C_6 - C_{10}$ aryl radicals, the mole ratio of anhydride to peroxy acid being from 0.1:1 to about 5:1, and
c. from 0.01 to about 10 percent, by weight, based on vinyl chloride, of alkaline buffering reagent.

32. The process of claim 31 wherein the acid anhydride is selected from the group consisting of isobutyric anhydride, propionic anhydride, acetic anhydride and mixtures of such anhydrides and the peroxy acid is peracetic acid.

33. The process of claim 32 wherein from about 0.001 to about 0.50 weight percent of at least one further organic free-radical initiator selected from the group consisting of tertiarybutyl perpivalate, tertiarybutyl perneodecanoate, lauroyl peroxide, benzoyl peroxide, azo-bis-isobutyronitrile and mixtures of such initiators is present during said polymerization.

34. The process of claim 32 wherein from 0.001 to about 0.50 weight percent, based on vinyl chloride, of a peroxydicarbonate ester represented by the formula,

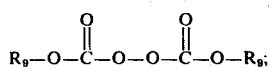

wherein $R_9$ is an aliphatic radical of from one to 20 carbon atoms, is present during said polymerization.

35. The process of claim 34 wherein the peroxydicarbonate ester is diisopropylperoxydicarbonate, di-n-propylperoxydicarbonate, di-secbutylperoxydicarbonate, di-2-ethylhexylperoxydicarbonate, dicyclohexylperoxydicarbonate, or di-4-tertiarybutyl cyclohexylperoxydicarbonate.

36. The process of claim 34 wherein the alkaline buffering reagent is sodium bicarbonate or quaternary ammonium hydroxide.

37. In the process for polymerizing ethylenically unsaturated material susceptible to polymerization with free-radical type initiators in an aqueous or bulk polymerization medium, the improvement which comprises conducting said polymerization in the presence of an initiator system comprising, in combination, (a) alkaline buffering reagent, (b) organic acid anhydride represented by the general formula,

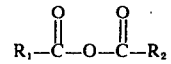

wherein $R_1$ and $R_2$ are each selected from the group consisting of substituted and unsubstituted $C_1 - C_{12}$ alkyl, $C_6 - C_{10}$ cycloalkyl and $C_6 - C_{10}$ aryl radicals, and (c) hydrogen peroxide said alkaline buffering reagent, acid anhydride and hydrogen peroxide being present in amounts sufficient to polymerize the ethylenically unsaturated material.

38. The process of claim 37 wherein from about 0.001 to about 3 weight percent of acid anhydride, based on the ethylenically unsaturated material, is used and the mole ratio of hydrogen peroxide to acid anhydride is from about 0.1:1 to about 10.0:1.

39. The process of claim 38 wherein the acid anhydride is selected from the group consisting of acetic anhydride, propionic anhydride, isobutyric anhydride and mixtures of such anhydrides.

40. The process of claim 39 wherein the alkaline buffering reagent is sodium bicarbonate or quaternary ammonium hydroxide and the ethylenically unsaturated material is vinyl chloride.

41. The process of claim 37 wherein at least one further organic free-radical initiator selected from the group consisting of tertiary butyl peroxyesters, diacyl peroxides, peroxydicarbonate esters, and azo-bis-isobutyronitrile is present in said polymerization medium.

42. The process of claim 41 wherein said further organic free-radical initiator is selected from the group consisting of tertiarybutyl perpivalate, tertiary butyl perneodecanoate, lauroyl peroxide, benzoyl peroxide, azo-bis-isobutyronitrile, diisopropylperoxydicarbonate, di-n-propylperoxydicarbonate, di-sec-butylperoxydicarbonate, di-2-ethylhexylperoxydicarbonate, dicyclohexylperoxydicarbonate, di-4-tetriarylbutyl cyclohexylperoxydicarbonate and mixtures of such initiators.

43. The process of claim 41 wherein said peroxydicarbonate esters can be represented by the general formula,

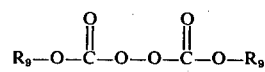

wherein $R_9$ is an aliphatic radical of from 2 to 12 carbon atoms or an aromatic radical of from 6 to 8 carbon atoms.

44. The process of claim 41 wherein from 0.001 to 0.50 weight percent, based on ethylenically unsaturated monomer, of said further organic free-radical initiator is used.

45. The process of claim 37 wherein the monomer is vinyl chloride.

46. In the process for polymerizing ethylenically unsaturated material susceptible to polymerization with free radical type initiators in an aqueous or bulk polymerization medium at from about 0°C. to about 90°C., the improvement which comprises introducing organic acid anhydride represented by the general formula,

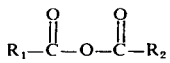

wherein $R_1$ and $R_2$ are each selected from the group consisting of substituted and unsubstituted $C_1 - C_{12}$ alkyl, and $C_6 - C_{10}$ aryl and $C_6 - C_{10}$ cycloalkyl radicals, hydrogen peroxide and alkaline buffering reagent into said polymerization medium each in amounts sufficient to generate, in situ, diacyl peroxide, in an amount sufficient to polymerize the ethylenically unsaturated material.

47. The process of claim 46 wherein from about 0.001 to about 3 weight percent of acid anhydride, based on the ethylenically unsaturated material, is used and the mole ratio of hydrogen peroxide to acid anhydride is from about 0.1:1 to about 10.0:1.

48. The process of claim 46 wherein the ethylenically unsaturated monomer is vinyl chloride.

49. The process of claim 46 wherein from 0.001 to 0.50 weight percent, based on unsaturated monomer, of a further organic free-radical initiator selected from the group consisting of tertiary butyl peroxyesters, diacyl peroxides, peroxydicarbonate esters, and azo-bis-isobutyronitrile is present during said polymerization.

50. The process of claim 46 wherein the anhydride is selected from the group consisting of acetic anhydride, propionic anhydride, isobutyric anhydride and mixture of said anhydrides; and the alkaline buffering agent is selected from the group consisting of sodium bicarbonate and quaternary ammonium hydroxide.

51. In the process for polymerizing vinyl chloride in an aqueous or bulk polymerization medium with free-radical initiator, the improvement which comprises conducting the polymerization with an initiator system comprising (a) from about 0.001 to about 3 weight percent, based on vinyl chloride, of at least one acid anhydride represented by the general formula,

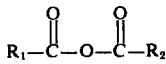

wherein $R_1$ and $R_2$ are each selected from the group consisting of $C_1-C_{20}$ alkyl, $C_6-C_{10}$ cycloalkyl and $C_6-C_{10}$ aryl radicals, (b) hydrogen peroxide, the mole ratio of hydrogen peroxide to acid anhydride being from about 0.5:1 to about 10.0:1, and (c) from 0.01 to about 10 percent by weight, based on vinyl chloride, of an alkaline buffering reagent.

52. The process of claim 51 wherein the acid anhydride is selected from the group consisting of acetic anhydride, propionic anhydride, isobutyric anhydride and mixture of such anhydrides.

53. The process of claim 52 wherein the buffering reagent is selected from the group of sodium bicarbonate and quaternary ammonium hydroxide.

54. The process of claim 52 wherein from 0.001 to about 0.50 weight percent, based on vinyl chloride, of a peroxydicarbonate ester represented by the formula,

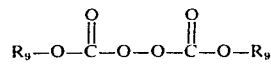

wherein $R_9$ is an aliphatic radical of from 1 to 20 carbon atoms, is also used to conduct said polymerization.

55. The process of claim 54 wherein the peroxydicarbonate ester is diisopropylperoxydicarbonate, di-n-propylperoxydicarbonate, di-sec-butylperoxydicarbonate, di-2-ethylhexylperoxydicarbonate, dicyclohexylperoxydicarbonate, or di-4-tertiarybutyl cyclohexylperoxydicarbonate.

56. The process of claim 51 wherein the polymerization is conducted as a bulk polymerization and the alkaline buffering reagent is an organic base.

57. The process of claim 52 wherein from 0.001 to 0.50 weight percent, based on vinyl chloride, of a further organic free-radical initiator selected from the group consisting of tertiary butyl peroxyesters, diacyl peroxides, peroxydicarbonate esters, and azo-bis-isobutyronitrile is also used to conduct said polymerization.

58. In the process for polymerizing vinylically unsaturated materials susceptible to polymerization with free-radical type initiators in an aqueous polymerization medium, the improvement which comprises conducting said polymerization in the presence of an initiator system comprising, in combination, (a) an acid anhydride represented by the general formula,

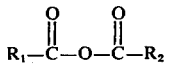

wherein $R_1$ and $R_2$ are each selected from $C_1 - C_{20}$ straight chain alkyl and isopropyl, (b) hydrogen peroxide, and (c) alkaline buffering reagent, said anhydride, hydrogen peroxide and alkaline buffering reagent being present in amounts sufficient to polymerize the vinylically unsaturated material.

59. The process of claim 58 wherein the anhydride is selected from the group consisting of acetic anhydride, propionic anhydride, isobutyric anhydride and mixture of said anhydrides.

60. The process of claim 59 wherein the alkaline buffering agent is selected from the group consisting of sodium bicarbonate and quaternary ammonium hydroxide.

61. The process of claim 59 wherein a further organic free-radical initiator selected from the group consisting of tertiary butyl peroxyesters, diacyl peroxides, peroxydicarbonate esters and azo-bis-isobutyronitrile are also present in the polymerization medium in amounts of from 0.001 to about 0.50 weight percent, based on vinylically unsaturated material.

62. The process of claim 61 wherein the unsaturated material is vinyl chloride.

\* \* \* \* \*